United States Patent
Kamoi

(10) Patent No.: US 11,662,957 B2
(45) Date of Patent: May 30, 2023

(54) IMAGE FORMING DEVICE AND NON-TRANSITORY COMPUTER READABLE MEDIUM FOR REGISTERING STORAGE BOX

(71) Applicant: FUJIFILM BUSINESS INNOVATION CORP., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 73 days.

(21) Appl. No.: 16/655,320

(22) Filed: Oct. 17, 2019

(65) Prior Publication Data

US 2020/0401354 A1 Dec. 24, 2020

(30) Foreign Application Priority Data

Jun. 21, 2019 (JP) .............................. JP2019-115473

(51) Int. Cl.
*H04N 1/00* (2006.01)
*G06F 3/12* (2006.01)

(52) U.S. Cl.
CPC ............ *G06F 3/1204* (2013.01); *G06F 3/123* (2013.01)

(58) Field of Classification Search
None
See application file for complete search history.

(56) References Cited

U.S. PATENT DOCUMENTS

2008/0127307 A1* 5/2008 Fukuta ................. H04N 1/4433 726/3
2014/0078551 A1* 3/2014 Haba ..................... G06F 3/1296 358/1.14
2014/0156784 A1* 6/2014 Buck ....................... H04W 4/50 709/217
2015/0055173 A1* 2/2015 Watariuchi ............. G06K 15/40 358/1.15
2018/0011652 A1* 1/2018 Tajima .................. G06F 3/0644

FOREIGN PATENT DOCUMENTS

| JP | 2005-184612 A | 7/2005 |
|---|---|---|
| JP | 2007-158602 A | 6/2007 |
| JP | 2011-160033 A | 8/2011 |
| JP | 2013-22872 A | 2/2013 |
| JP | 2014-060643 A | 4/2014 |
| JP | 2015-39805 A | 3/2015 |
| JP | 2017-151915 A | 8/2017 |

OTHER PUBLICATIONS

Oct. 18, 2022 Office Action issued in Japanese Patent Application No. 2019-115473.

* cited by examiner

*Primary Examiner* — Miya J Williams
*Assistant Examiner* — Pawan Dhingra
(74) *Attorney, Agent, or Firm* — Oliff PLC

(57) ABSTRACT

An image forming device includes a receiver and a switcher. The receiver receives data for executing a function of storing specific data in a preset private box. The switcher switches between first and second register modes when the function to be executed by using the data received by the receiver is copied into the image forming device. The first register mode is a mode in which a private box is manually registered in the image forming device. The second register mode is a mode in which a private box is automatically registered in the image forming device.

5 Claims, 12 Drawing Sheets

FIG. 8

List of private boxes

001 Suzuki
002 Yamada
003 Takahashi
004 Nakamura
005 (Unregistered)
006 (Unregistered)

FIG. 12

List of private boxes

Private box 002 is overwritten.

001 Suzuki
002 Fuji
003 Takahashi
004 Nakamura
005 (Unregistered)
006 (Unregistered)

IMAGE FORMING DEVICE AND NON-TRANSITORY COMPUTER READABLE MEDIUM FOR REGISTERING STORAGE BOX

CROSS-REFERENCE TO RELATED APPLICATIONS

This application is based on and claims priority under 35 USC 119 from Japanese Patent Application No. 2019-115473 filed Jun. 21, 2019.

BACKGROUND

(i) Technical Field

The present disclosure relates to an image forming device and a non-transitory computer readable medium.

(ii) Related Art

Japanese Unexamined Patent Application Publication No. 2013-022872 discloses the following image forming device. The image forming device receives from another device import data including data concerning a configuration file including setting values used by a first application and a list of IDs of multiple applications that can use the configuration file. If a second application having an ID different from the ID of the first application is stored in the image forming device, the image forming device imports this configuration file.

Japanese Unexamined Patent Application Publication No. 2015-039805 discloses the following image forming device. The image forming device reads a setting value to be used by replace importing. If replace importing has not been done in the image forming device, the read setting value is reflected in the image forming device. Then, the image forming device appends information indicating that the setting value has been used to source data corresponding to the setting value used in replace importing. The image forming device also changes the status of the device to indicate that replace importing has been done.

Japanese Unexamined Patent Application Publication No. 2017-151915 discloses the following information processing apparatus. The information processing apparatus receives a selected setting of a document management application to be exported. The information processing apparatus then obtains settings related to the selected setting and adds the related settings to the selected setting to be exported together. When exporting the selected setting, the information processing apparatus obtains the related settings if the selected setting is only part of the settings of the application.

SUMMARY

A device copies a function which uses a private box from another device. If a private box associated with this function is not yet created in this device, a user of the device is not able to use the function.

In this case, the user may manually create a private box associated with the function. Such work is however time and effort consuming for the user.

Even if a private box is already created in the device, a user may be using this box for another purpose. If this box is also used for the copied function, the user may be confused.

Aspects of non-limiting embodiments of the present disclosure relate to an image forming device and a non-transitory computer readable medium which are able to select a mode for registering a private box when a function using the private box is copied from another device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming device including a receiver and a switcher. The receiver receives data for executing a function of storing specific data in a preset private box. The switcher switches between first and second register modes when the function to be executed by using the data received by the receiver is copied into the image forming device. The first register mode is a mode in which a private box is manually registered in the image forming device. The second register mode is a mode in which a private box is automatically registered in the image forming device.

BRIEF DESCRIPTION OF THE DRAWINGS

An exemplary embodiment of the present disclosure will be described in detail based on the following figures, wherein:

FIG. 8 illustrates a list of private boxes in an image forming device, which is a cloning import device, before cloning is performed;

FIG. 12 illustrates a list of private boxes in an image forming device, which is a cloning import device, after a new private box is registered in the box number 002 by overwriting.

DETAILED DESCRIPTION

An exemplary embodiment of the disclosure will be described below in detail with reference to the accompanying drawings.

Figure 1:
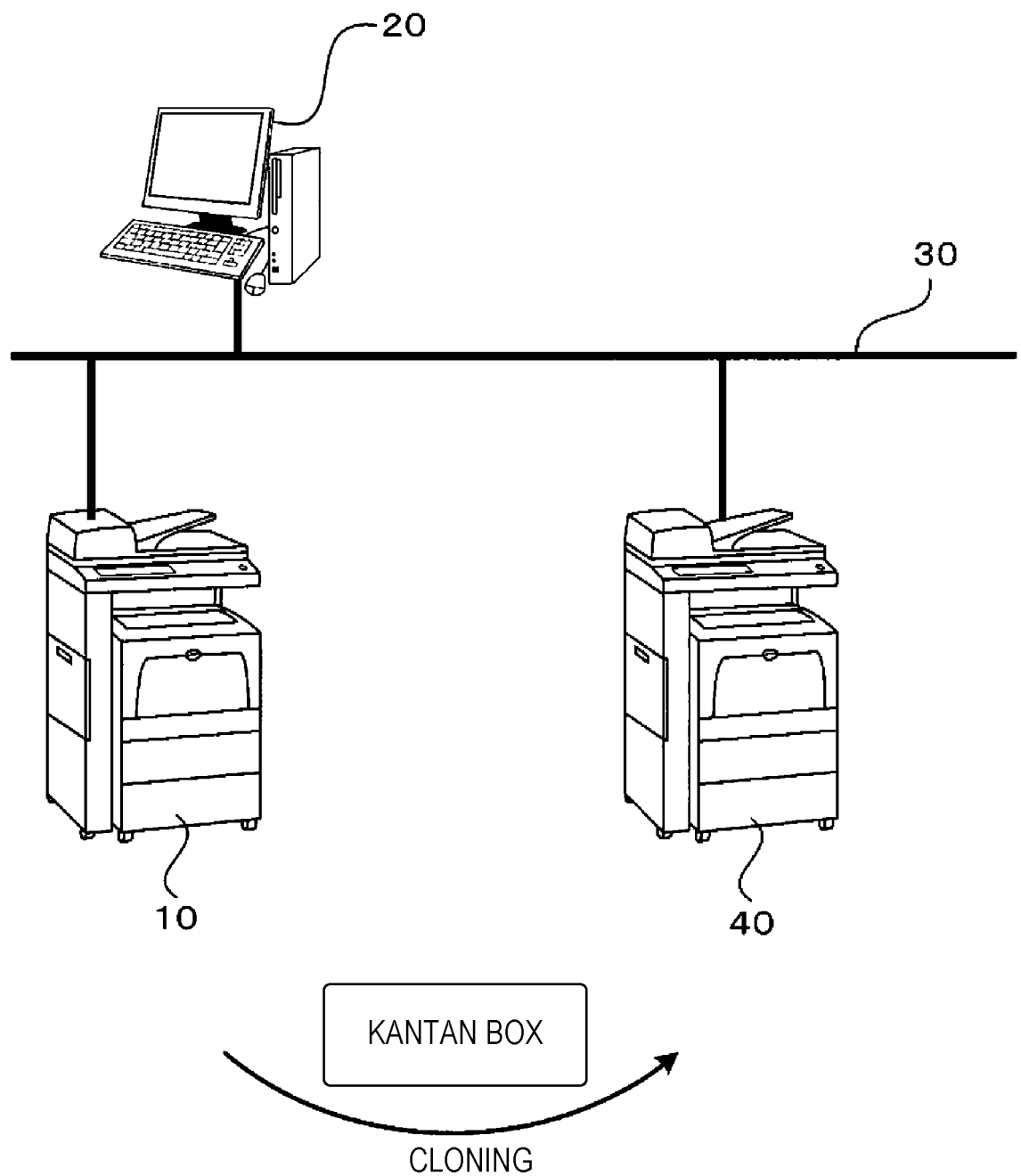
FIG. 1 is a schematic view illustrating an example of the configuration of an image forming system according to an exemplary embodiment of the disclosure.

FIG. 1 is a schematic view illustrating an example of the configuration of an image forming system according to the exemplary embodiment.

As shown in FIG. 1, the image forming system includes image forming devices 10 and 40 and a terminal device 20 connected to one another via a network 30. The terminal device 20 generates print data and sends it to the image forming device 10 via the network 30. The image forming device 10 receives the print data sent from the terminal device 20 and outputs an image on a sheet in accordance with the print data. The image forming device 10 is a multifunction device having multiple functions, such as print, scan, copy, and fax communication functions.

In this exemplary embodiment, cloning is performed to copy an application program (hereinafter simply called an app) generated in the image forming device 10 into the image forming device 40.

Cloning refers to copying of data or an app generated in one device or information concerning settings set in one device into another device. Cloning may be used for the following cases. When installing plural image forming devices, settings concerning user environments are set and user data is input into one image forming device, and then, such settings and various items of data are copied into the other image forming devices. In another case, when replacing an old image forming device by a new one, settings and various items of data concerning the old image forming device are stored as cloning data, and the cloning data is copied into the new image forming device. Cloning may also be used when restoring cloning data which is stored as backup data in case of data corruption.

Cloning can eliminate the need to recreate a one touch app generated in one image forming device in another image forming device.

In this exemplary embodiment, cloning will be explained through illustration of an example in which a "Kantan box (which means that data can be stored in a box with a simple operation)" app is copied from the image forming device 10 into the image forming device 40. This. "Kantan box" app is a one touch app created by a user and enables a user to store scanned data in a private box with a simple operation. More specifically, a user sets a document in a scanner and starts the "Kantan box" app. With this one touch operation, that is, one-time operation, the document is scanned with predetermined conditions, such as a preset color mode and resolution, and the read image data is stored in a specified private box.

Two types of one touch apps are available: one type is a private app that can be used only by one user; and the other type is a public app that can be used by registered multiple users.

The private box is a storage area for storing various items of data. An owner is set in a private box, and only this owner can read or extract various items of data from this private box, or only predetermined multiple users can read or extract various items of data.

Private boxes are managed by box number, and as a result of assigning a box number to each app, processed data can be stored in a selected private box.

Figure 2:
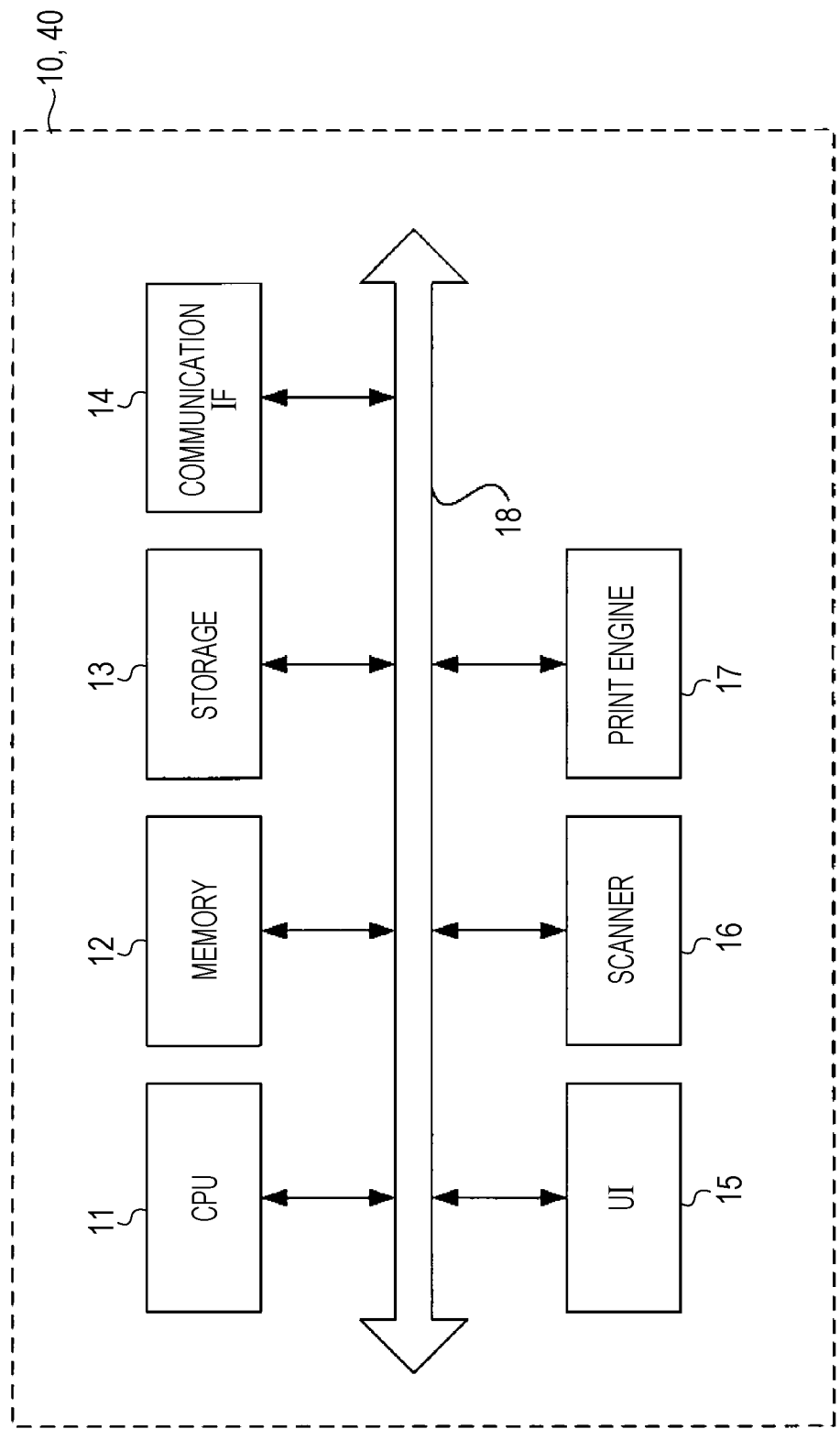
FIG. 2 is a block diagram illustrating an example of the hardware configuration of image forming devices according to an exemplary embodiment of the disclosure.

The hardware configuration of the image forming devices 10 and 40 of the image forming system according to the exemplary embodiment is shown in FIG. 2. In this exemplary embodiment, the image forming device 10 is a device which generates data or an app, while the image forming device 40 is a device which copies the generated data or app from the image forming device 10. The configurations of the image forming devices 10 and 40 are similar to each other.

As shown in FIG. 2, the image forming devices 10 and 40 each include a central processing unit (CPU) 11, a memory 12, a storage 13, such as a hard disk drive, a communication interface (IF) 14, a user interface (UI) 15, a scanner 16, and a print engine 17. The communication IF 14 sends and receives data to and from other devices via the network 30. The UI 15 includes a touchscreen or a liquid crystal display and a keyboard. These elements are connected to one another via a control bus 18.

The print engine 17 prints an image on a recording medium, such as a print sheet, after performing process steps, such as charging, exposure, developing, transfer, and fixing.

The CPU 11 executes predetermined processing based on a control program stored in the memory 12 or the storage 13 so as to control the operation of the image forming device 10. In this exemplary embodiment, the control program to be read and executed by the CPU 11 is stored in the memory 12 or the storage 13. However, the control program may be stored in a storage medium, such as a compact disc-read only memory (CD-ROM), and be provided to the CPU 11.

Figure 3:
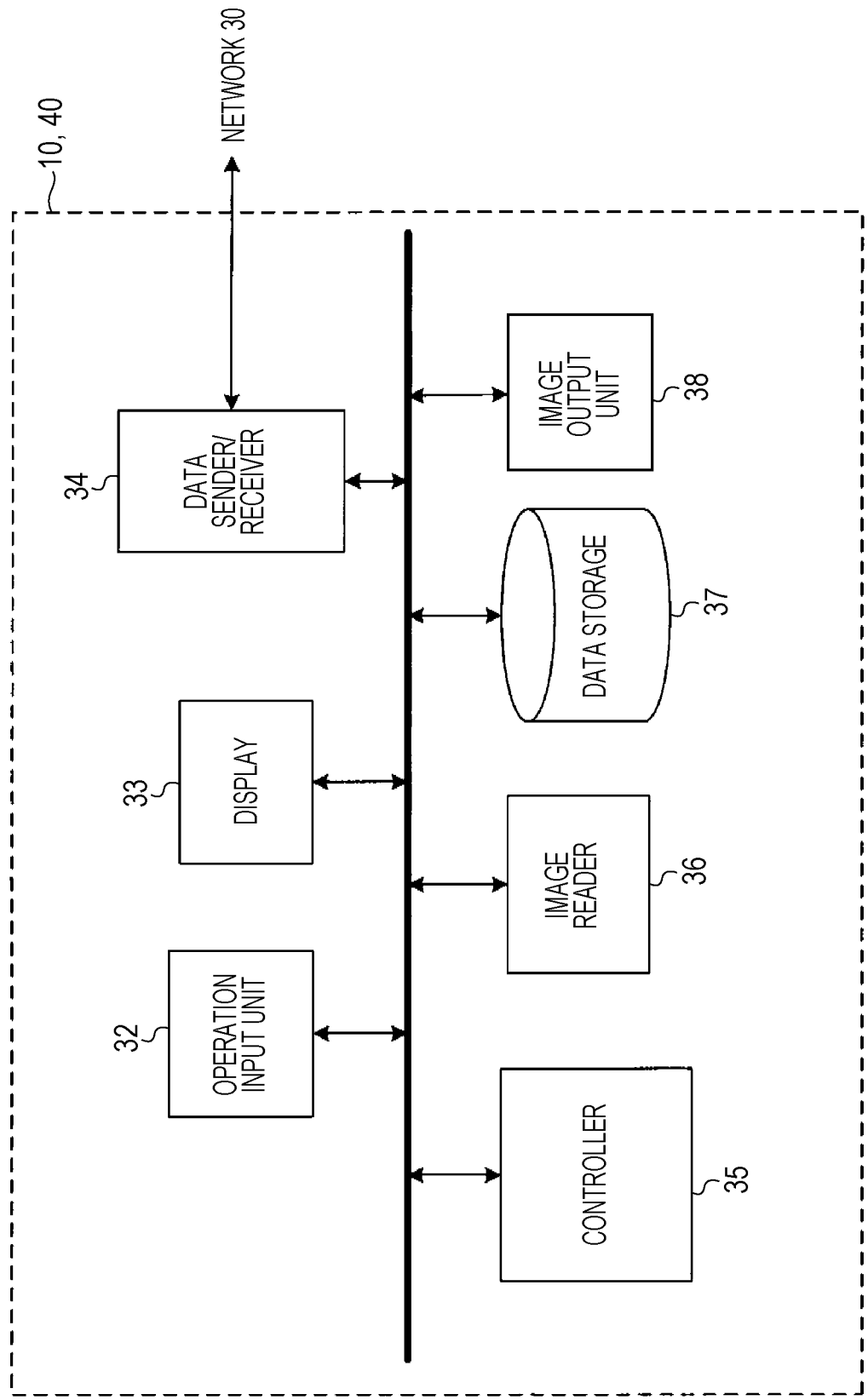
FIG. 3 is a block diagram illustrating an example of the functional configuration of the image forming devices.

FIG. 3 is a block diagram illustrating an example of the functional configuration of the image forming devices 10 and 40 implemented as a result of the CPU 11 executing the above-described control program.

As shown in FIG. 3, the image forming devices 10 and 40 each include an operation input unit 32, a display 33, a data sender/receiver 34, a controller 35, an image reader 36, a data storage 37, and an image output unit 38.

The operation input unit 32 receives various operations from a user. The display 33 displays various items of information for a user.

The image reader 36 reads an image from a set document. The image output unit 38 outputs an image to a recording medium, such as a print sheet. The data storage 37 stores various items of generated data, such as print data, under the control of the controller 35. Data stored in a private box is actually stored in the data storage 37.

Based on an operation received by the operation input unit 32, the controller 35 controls various elements such as the image reader 36, the image output unit 38, and the display 33 so as to cause these elements to perform various operations, such as printing and scanning.

The data sender/receiver 34 sends and receives data to and from other devices via the network 30. When cloning is performed, the data sender/receiver 34 outputs generated cloning data to an external device or receives cloning data generated in an external device.

Cloning data is data used for copying a function, such as data and various apps, by cloning. In this exemplary embodiment, data for executing an app called "Kantan box" is output from the image forming device 10 as cloning data and is input into the image forming device 40. The "Kantan box" app is an example of a function of storing specific data in a preset private box.

When copying a function to be executed by using data received by the data sender/receiver 34 into the image forming device 40, the controller 35 switches between first and second register modes. The first register mode is a mode in which a private box is manually registered in the image forming device 40. The second register mode is a mode in which a private box is automatically registered in the image forming device 40.

The reason why the register mode for registering a private box is switched when cloning is performed is as follows. A private box having the same box number as the private box used by the "Kantan box" app may be registered in an image forming device into which a function is copied by cloning (such a device will simply be called a cloning import device) and may be used by another user.

Every time cloning is performed, a user may check how private boxes are used in a cloning import device and then register a private box for an app to be copied in the cloning import device. However, if many apps are copied into a cloning import device, it takes a lot of time and effort to check the private boxes used in the cloning import device.

If a private box for an app to be copied is registered by ignoring private boxes used in the cloning import device, and to put it more specifically, if the private box is registered in the cloning import device by overwriting a private box having the same box number as the private box for the app, a function used in the cloning import device may fail to operate correctly.

Additionally, it is possible to restrict users allowed to write data into a private box. If a private box having the same box number as a private box for an app is already registered in a cloning import device and if this private box is used also for the app, an authorized user may fail to write data into this private box, resulting in an error when executing the app.

A private box also has a function of executing predetermined processing on stored document data, such as sending of stored document data to a specific address by fax. If a user stores data in a private box registered in a cloning import device, processing that the user does not wish may be executed.

Whether priority is given to maintaining a private box registered in a cloning import device or to reducing the time and effort for performing cloning depends on the situation where cloning is performed. If cloning is performed to copy various apps into an image forming device which is not being used, it is not necessary to maintain a private box registered in the image forming device, and priority is thus given to reducing the time and effort for performing cloning. In contrast, if a user is transferred to a new department and copies an app created in an image forming device at the previous department into another image forming device at the new department, priority is given to maintaining a private box registered in the image forming device at the new department.

In this exemplary embodiment, considering such various situations, when a function using a private box is copied from one device to another device by cloning, it is possible to switch between the first register mode and the second register mode in a cloning import device. As described above, the first register mode is a mode in which a private box is manually registered in a cloning import device, while the second register mode is a mode in which a private box is automatically registered in a cloning import device.

The first register mode includes two modes. In one mode, a private box is registered exclusively manually. In the other mode, a private box is registered manually if a private box having the same box number as the private box to be registered exists in a cloning import device.

The second register mode includes two modes. In one mode, if a private box having the same box number as a private box to be registered exists in a cloning import device, the private box is registered by overwriting the existing private box. In the other mode, the private box is registered in an available box number.

A user performing cloning may manually switch between the above-described register modes or an image forming device may automatically switch between the register modes in accordance with the situation.

For example, the controller 35 switches between the first register mode and the second register mode in accordance with the number of users using an image forming device from which an app is copied into another device (such an image forming device will simply be called a cloning export device) or the number of private boxes registered in the cloning export device. In this case, information concerning the number of users using the cloning export device or the number of private boxes registered in the cloning export device is required to be appended to cloning data.

More specifically, if the number of users using the cloning export device is smaller than a predetermined number or if the number of private boxes registered in the cloning export device is smaller than a predetermined number, the controller 35 selects the first register mode. For example, if the number of users using the cloning export device is smaller than eleven or if the number of private boxes registered in the cloning export device is smaller than eight, the controller 35 selects the first register mode to register a private box manually. With fewer users or fewer private boxes, it does not take a lot of time and effort for a user to register a private box manually. By using the first register mode, every time a user registers a private box, it can visually check how registration is conducted, thereby reducing errors in performing cloning compared with the second mode for automatically registering a private box.

In other words, if the number of users using the cloning export device is larger than a predetermined number or if the number of private boxes registered in the cloning export device is larger than a predetermined number, the controller 35 selects the second register mode. With many users or many private boxes, it takes a lot of time and effort for a user to register a private box manually. Using the second register mode saves the user the trouble of registering a private box manually.

The controller 35 may switch between the first register mode and the second register mode in accordance with the number of users using a cloning import device or the number of private boxes registered in the cloning import device.

More specifically, if the number of users using the cloning import device is larger than a predetermined number or if the number of private boxes registered in the cloning import device is larger than a predetermined number, the controller 35 selects the first register mode. For example, if the number of users using the cloning import device is larger than ten or if the number of private boxes registered in the cloning import device is larger than eight, the controller 35 selects the first register mode to register a private box manually. With many users using the cloning import device or many private boxes registered in the cloning import device, the occurrence of errors in performing cloning negatively influences more users or more private boxes of the cloning import device. It is thus safer to select the first register mode to register a private box manually.

In other words, if the number of users using the cloning import device is smaller than a predetermined number or if the number of private boxes registered in the cloning import device is smaller than a predetermined number, the controller 35 selects the second register mode. With fewer users using the cloning import device or fewer private boxes registered in the cloning import device, the occurrence of errors in performing cloning negatively influences less users or less private boxes. It is thus quicker to register a private box by using the second register mode.

Operations performed by the image forming devices 10 and 40 according to the exemplary embodiment will be described below in detail with reference to FIGS. 4 through 12.

Processing executed by the image forming device 10, which is a cloning export device, when generating cloning data will first be discussed below with reference to the flowchart of FIG. 4.

In step S101, a user who is a machine administrator provides an instruction to generate data for copying a one touch app by operating an operation panel of the image forming device 10.

In step S102, the user selects a mode for registering a private box when the one touch app is started. An example of the display screen displayed on the operation panel of the image forming device 10 is shown in FIG. 5.

Figure 5:
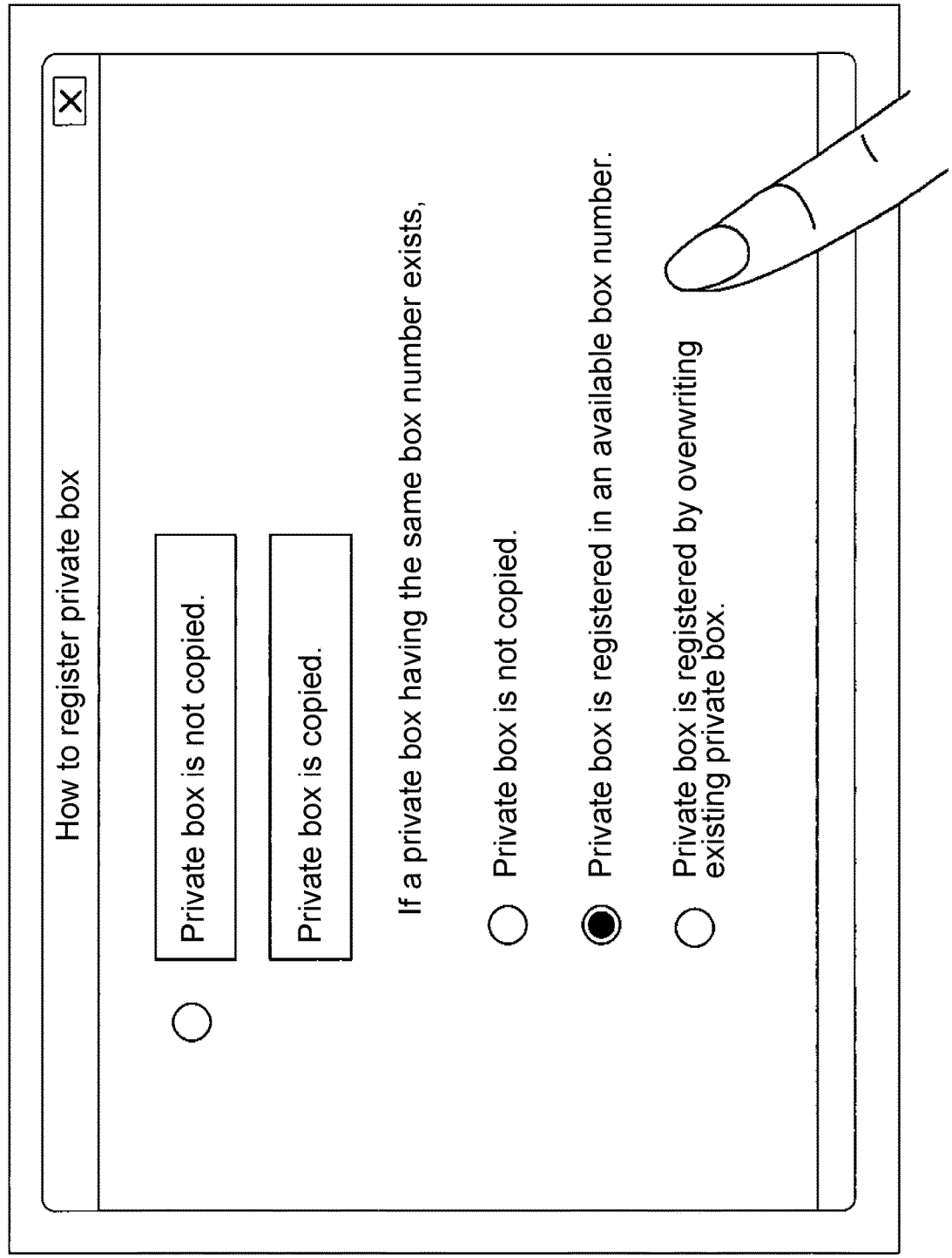
FIG. 5 illustrates an example of a display screen displayed on an operation panel to select a mode for registering a private box at the start of a one touch app.

In the example of the display screen in FIG. 5, the user is able to select from among: register mode 1 in which a private box is not copied; register mode 2 in which a private box is copied, but if a private box having the same box number as the private box to be registered exists in a cloning import device, the private box is not copied; register mode 3 in which a private box is copied, and if a private box having the same box number as the private box to be registered exists in a cloning import device, the private box is registered in an available box number; and register mode 4 in which a private box is copied, and if a private box having the same box number as the private box to be registered exists in a cloning import device, the private box is registered by overwriting the existing private box.

Figure 6:
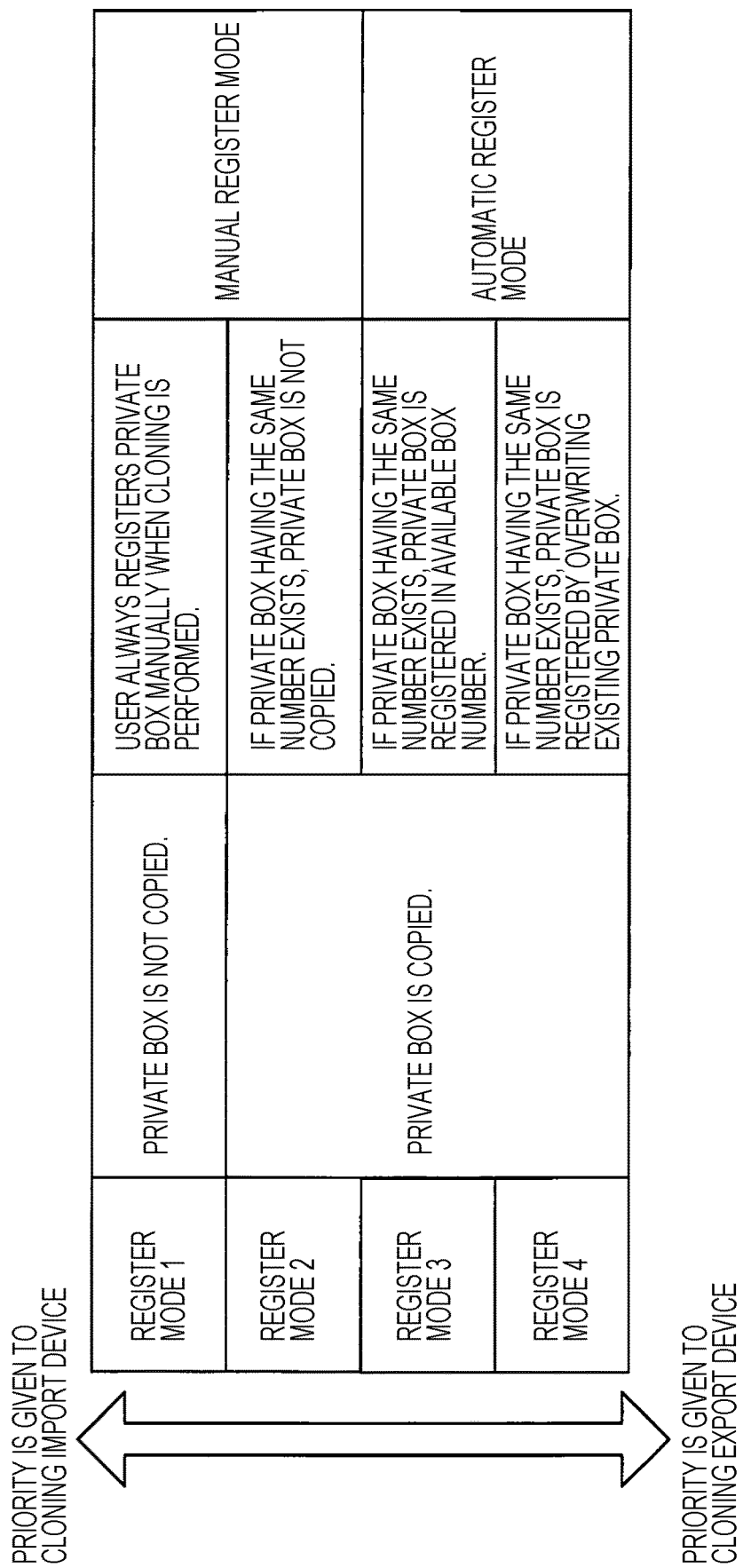
FIG. 6 is a table for explaining details of four register modes selectable on the display screen shown in FIG. 5.

Details of these four register modes will be discussed with reference to FIG. 6.

In register mode 1, a private box is not copied. More specifically, a user always registers a private box manually when cloning is performed. By using register mode 1, a private box can safely be created and an app can be executed under the observation of a user using the app, but on the other hand, manual operation is always required, which is time and effort consuming for the user.

In register mode 2, the private box is copied, but if a private box having the same box number as the private box to be registered exists in a cloning import device, the private box is not copied. More specifically, if a private box having the same box number does not exist in a cloning import device, a private box for an app is automatically copied, but if a private box having the same box number exists in the cloning import device, the private box for an app is manually registered by a user. By using register mode 2, a private box is automatically registered if a private box having the same box number as the private box to be registered is not found in a cloning import device. This is less time and effort consuming for a user than in register mode 1. If a private box having the same box number is found in a cloning import device, a private box is created manually by a user so that it can safely be created and an app can be executed.

In register mode 3, a private box is copied, and if a private box having the same box number as the private box to be registered exists in a cloning import device, the private box is registered in an available box number. More specifically, if a private box having the same box number exists in a cloning import device, an unregistered box number is searched for, and the private box is registered in this box number.

By using register mode 3, a private box already registered in a cloning import device is not changed, and a job can be executed as before. Concerning an app copied into the cloning import device, a job can be executed by using this app although the box number of the private box for this app is changed. That is, user convenience is higher than in register mode 2, and the security is stronger and malfunctioning is less likely to occur than in register mode 4. However, the box number of the private box for the app is changed without the knowledge of the user. The user may thus find it difficult to identify to which private box the user can refer to extract a scanned document.

In register mode 4, a private box is copied, and if a private box having the same box number as the private box to be registered exists in a cloning import device, the private box is registered by overwriting the existing private box. More specifically, if a private box having the same box number exists in a cloning import device, it is erased and a private box for an app is registered without changing its box number.

By using register mode 4, in a cloning import device, an app can be executed in exactly the same environments as those in a cloning export device. Additionally, in whatever manner private boxes are registered in a cloning import device, cloning can be performed without user intervention. On the other hand, however, a private box registered in the cloning import device is replaced by that used for the app, and malfunctioning may occur in the cloning import device, such as a job used to be executed in the cloning import device can no longer be executed. Additionally, a security issue may arise in the cloning import device.

As is seen from the foregoing description, register mode 1 is a mode in which priority is given to a cloning import device, that is, to maintaining a private box registered in the cloning import device, while register mode 4 is a mode in which priority is given to a cloning export device, that is, to reproducing the same state of the cloning export device in a cloning import device.

Register mode 1 is a mode in which a private box is registered manually by a user and register mode 2 is a mode in which a private box may be registered manually by a user depending on the situation. In contrast, register modes 3 and 4 are modes in which a private box is registered automatically without user intervention.

Figure 4:
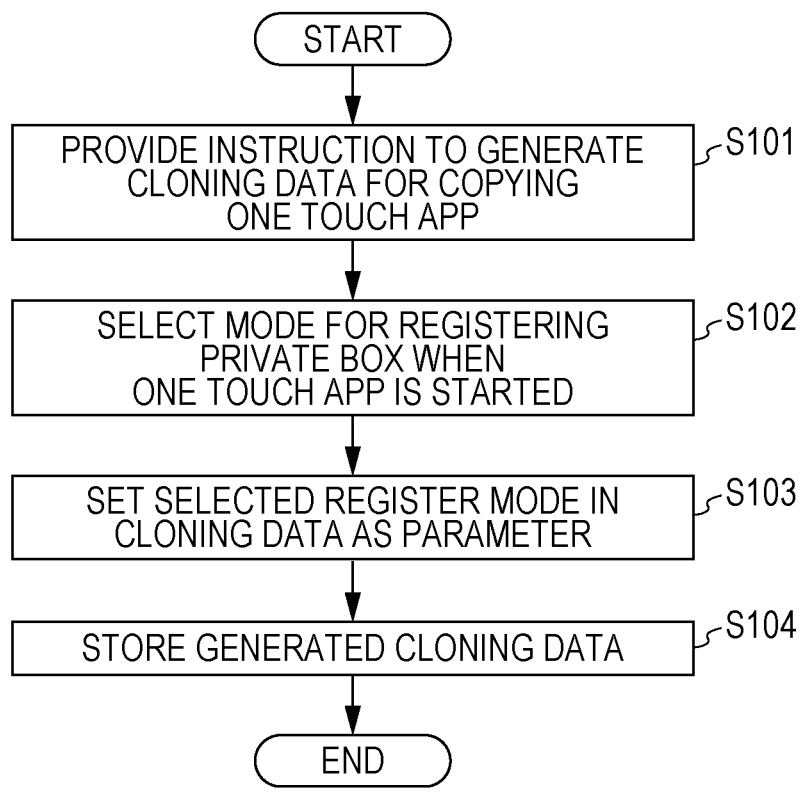
FIG. 4 is a flowchart illustrating processing executed by an image forming device, which is a cloning export device, when generating cloning data.

In step S103 in FIG. 4, information concerning the register mode selected as described above is set as a parameter in cloning data, together with "Kantan box" app data.

In step S104, cloning data generated as described above is stored in the data storage 37 of the image forming device 10.

Then, the machine administrator copies the cloning data stored in the image forming device 10 into the image forming device 40 by using a universal serial bus (USB) memory or via the network 30 and instructs the image forming device 40 to load the cloning data.

Then, the image forming device 40 has become ready to use the "Kantan box" app. Processing for registering a private box in the image forming device 40 is executed when the "Kantan box" app is started for the first time.

Figure 7:
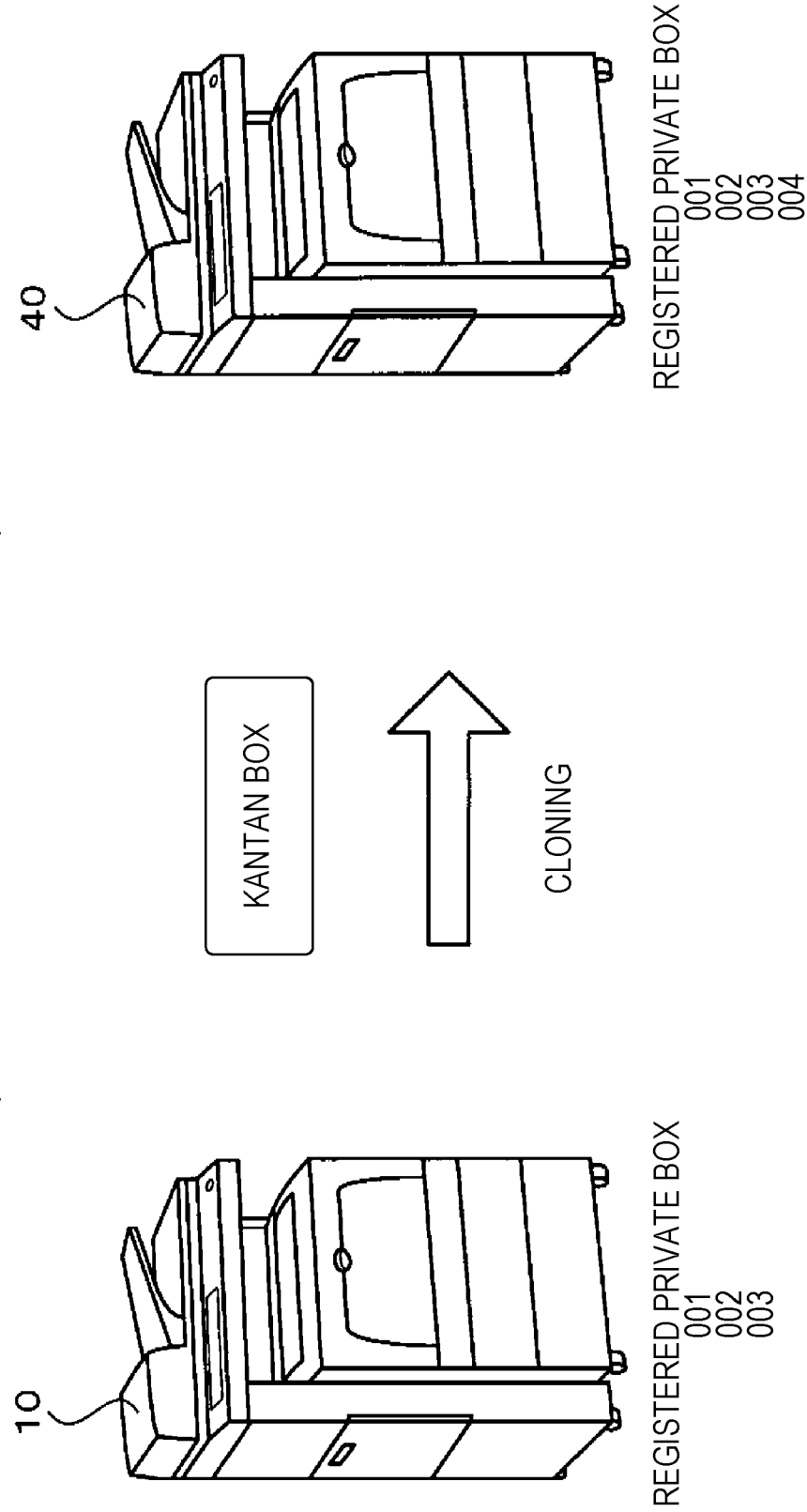
FIG. 7 is a schematic view illustrating that private boxes are registered in the image forming devices.

The following description will be given, assuming that private boxes are already registered in the image forming devices 10 and 40 as shown in FIG. 7.

FIG. 7 shows that three private boxes having box numbers 001 through 003 are registered in the image forming device 10, which is a cloning export device, and the box number 002 is assigned to the "Kantan box" app.

FIG. 7 also shows that four private boxes having box numbers 001 through 004 are registered in the image forming device 40, which is a cloning import device. A list of private boxes in the image forming device 40 before cloning is performed is shown in FIG. 8. FIG. 8 shows that private boxes called "Suzuki", "Yamada", "Takahashi", and "Nakamura" are registered in the box numbers 001 through 004, respectively. Box numbers 005 and 006 are unregistered and are thus available.

Figure 9:
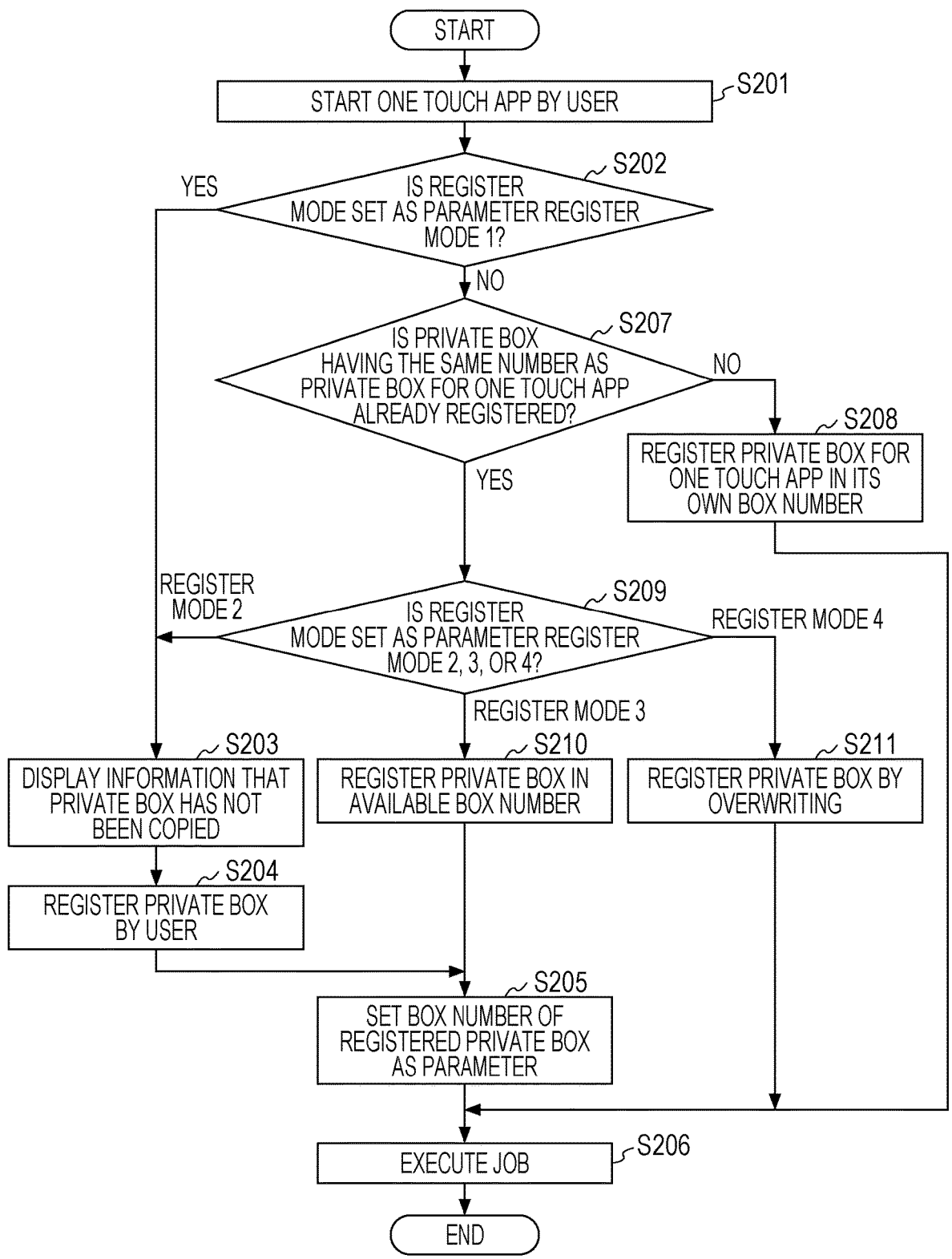
FIG. 9 is a flowchart illustrating an operation executed by an image forming device, which is a cloning import device, when a one touch app called "Kantan box" is started for the first time.

The operation executed by the image forming device 40 when the "Kantan box" app is started for the first time in the above-described state will be described below with reference to the flowchart of FIG. 9.

In step S201, a user starts a one touch app. Then, in step S202, it is judged whether the register mode set as a parameter of cloning data is register mode 1. If the register mode is found to be register mode 1, that is, a register mode in which a private box is not copied, the process proceeds to step S203. In step S203, a display screen, such as that shown in FIG. 10, is displayed on the operation panel so as to inform the user that the private box has not been copied.

Figure 10:
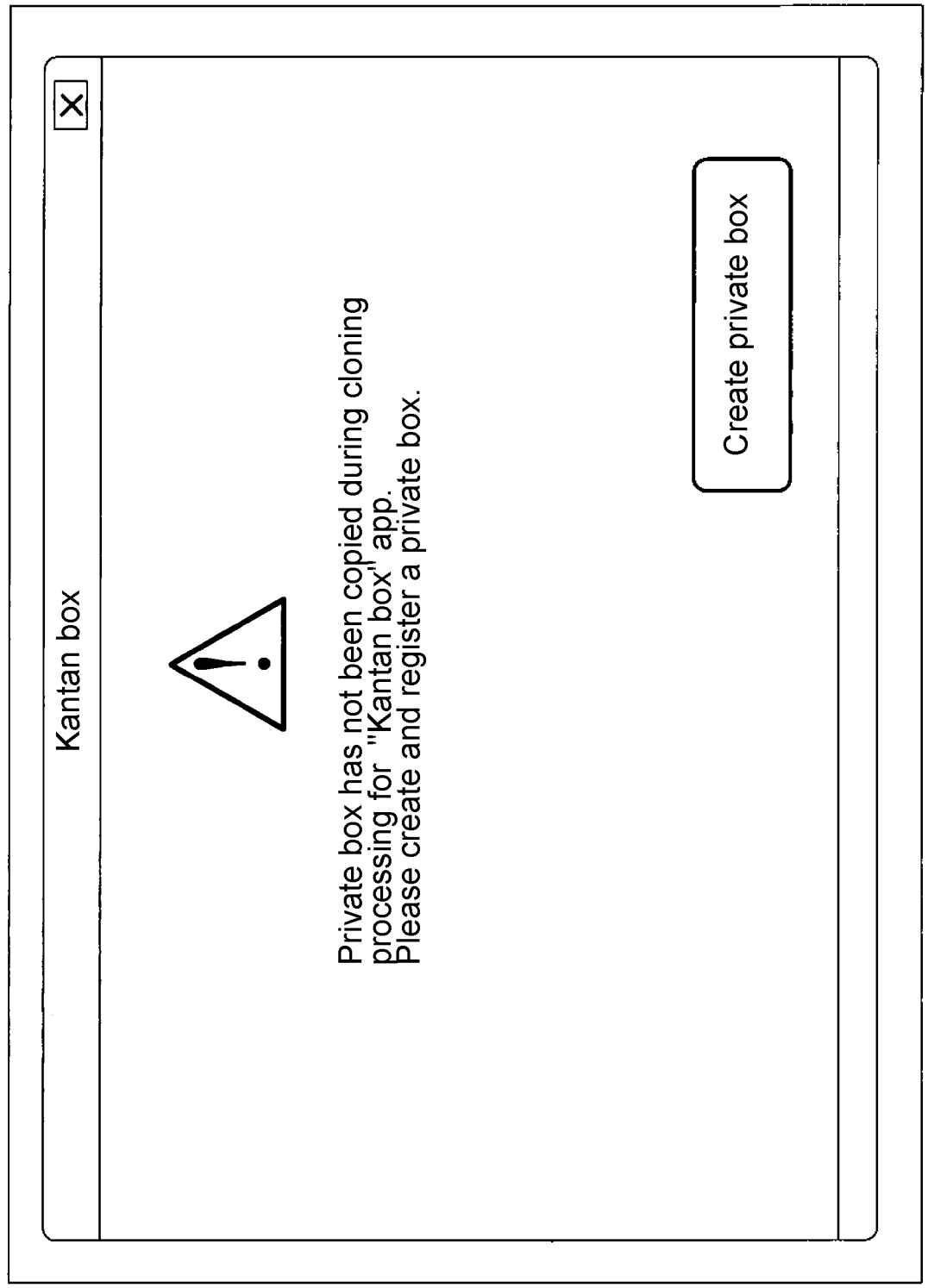
FIG. 10 illustrates an example of a warning screen to inform a user that a private box is not yet copied.

In the example in FIG. 10, the display screen is a warning screen which informs the user that the private box has not been copied when the one touch app called "Kantan box" has been incorporated by cloning and instructs the user to create and register a private box.

When the user operates a "create private box" button after checking the display screen in FIG. 10, the warning screen is switched to an operation screen for creating and registering a private box. In step S204, the user registers a private box.

In step S205, the user registers the box number of the new private box as a parameter of the one touch app called "Kantan box".

For example, the user checks the registration status of private boxes in the image forming device 40 and identifies that the box numbers 001 through 004 have been used. Then, the user registers the new private box in the box number 005. Then, in step S205, the parameter representing the box number of the private box used by the one touch app called "Kantan box" is changed from 002 to 005.

Then, in step S206, a job of the one touch app called "Kantan box" is executed.

If it is found in step S202 that the register mode set as a parameter of cloning data is not register mode 1, the process proceeds to step S207. In step S207, it is judged whether a private box having the same box number as the private box used by the "Kantan box" app, that is, a private box having the box number 002, is already registered in the image forming device 40.

If a private box having the same box number is not registered in the image forming device 40, the process proceeds to step S208. In step S208, the private box is registered in its own box number, that is, the box number 002. Then, in step S206, a job of the "Kantan box" app is executed.

If it is found in step S207 that a private box having the same box number is already registered in the image forming device 40, the register mode set as the parameter is judged in step S209.

If the register mode set as the parameter is found to be register mode 2, the process proceeds to step S203 and the user registers a private box manually.

If the register mode set as the parameter is found to be register mode 3, the process proceeds to step S210. In step S210, processing for registering a private box in an available box number is automatically executed.

Figure 11:
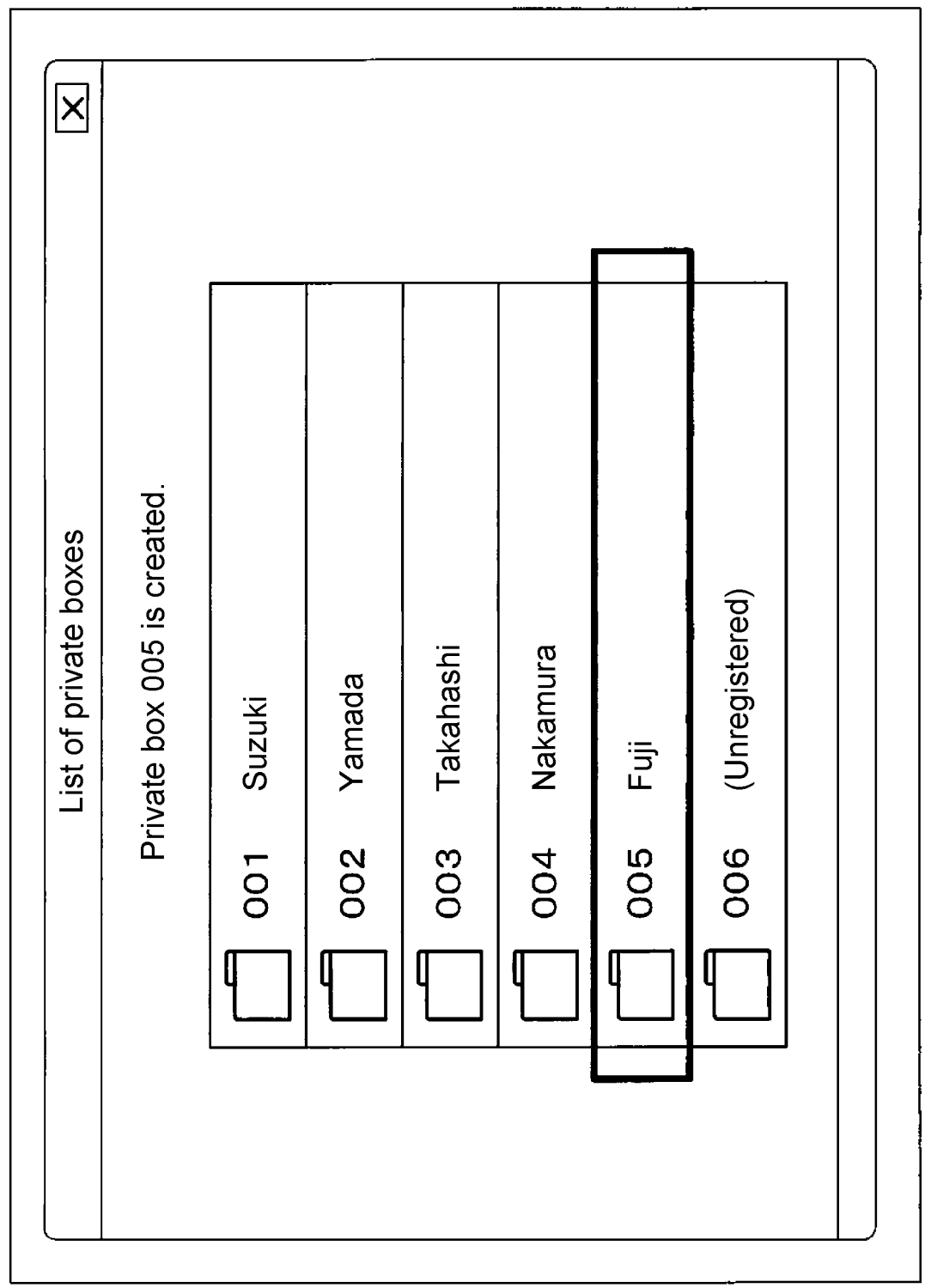
FIG. 11 illustrates a list of private boxes in an image forming device, which is a cloning import device, after a new private box is registered in an available box number.

A list of private boxes in the image forming device 40 after the private box is registered in an available box number is shown in FIG. 11.

FIG. 11 shows that the private box called "Fuji" is registered in the box number 005, unlike the list of private boxes shown in FIG. 8. The private box called "Fuji" is a private box to be used by the one touch app called "Kantan box".

Then, in step S205, the parameter representing the box number of the private box used by the "Kantan box" app is changed from 002 to 005. Then, in step S206, a job of the "Kantan box" app is executed.

If the register mode set as the parameter is found to be register mode 4, the process proceeds to step S211. In step S211, the private box is registered by overwriting the private box in the box number 002 in the image forming device 40. Then, in step S206, a job of the "Kantan box" app is executed. In this case, the box number of the private box set for the "Kantan box" app remains the same even after cloning.

A list of private boxes in the image forming device 40 after the new private box is registered in the box number 002 by overwriting is shown in FIG. 12.

FIG. 12 shows that the private box called "Yamada" in the box number 002 has been replaced by the new private box called "Fuji", unlike the list of private boxes shown in FIG. 8.

As a result of executing this overwriting processing, the private box called "Yamada" is deleted, and when an app using this private box is executed, an error may occur.

In this exemplary embodiment, the machine administrator performing cloning selects a register mode and sets it as a parameter when creating cloning data in the image forming device 10, which is a cloning export device. If, however, a register mode is not selected in the image forming device 10, a user may select a register mode in the image forming device 40 when starting a one touch app for the first time.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming device comprising:
   a processor programed to
      receive data for cloning an application and associated with a preset private box number, the received data (i) being received from an external image forming device that stores the application in the preset private box number and (ii) including a registration setting for registering the application;
      load the received data for cloning;
      select, based on the registration setting of the received data for cloning, between first and second register modes after the application to be executed by using the received data for cloning is cloned into the image forming device, the first register mode being a mode for manual private box number association with the application in the image forming device, the second register mode being a mode for automatic private box number association with the application in the image forming device; and register the cloned application based on the selected one of the first register mode and the second register mode, wherein the application is configured to store scanned data in the preset private box number, the scanned data is different from the received data for cloning, and the registering of the cloned application results in association of the cloned application in the image forming device with the preset private box number or another private box number in the image forming device.

2. The image forming device according to claim 1, wherein, in the first register mode, the processor selects between (i) a first setting of only the manual private box number association and (ii) a second setting in which the automatic private box number association is executed unless a private box having the same number as the preset private box number exists in the image forming device.

3. The image forming device according to claim 1, wherein the second register mode includes a first setting in which, if an existing private box associated with the preset private box number exists in the image forming device, the cloned application is registered by overwriting the existing private box, and a second setting in which, if the existing private box associated with the preset private box number exists in the image forming device, the cloned application is registered with an available box number different than the preset private box number and without overwriting the existing private box.

4. A non-transitory computer readable medium storing a program causing an image forming device to execute a process, the process comprising:

receiving data for cloning an application and associated with a preset private box number, the received data (i) being received from an external image forming device that stores the application in the preset private box number and (ii) including a registration setting for registering the application;

loading the received data for cloning;

selecting, based on the registration setting of the received data for cloning, between first and second register modes after the application to be executed by using the received data for cloning is cloned into the image forming device, the first register mode being a mode for manual private box number association with the application in the image forming device, the second register mode being a mode for automatic private box number association with the application in the image forming device; and registering the cloned application based on the selected one of the first register mode and the second register mode, wherein the application is configured to store scanned data in the preset private box number, the scanned data is different from the received data for cloning, and the registering of the cloned application results in association of the cloned application in the image forming device with the preset private box number or another private box number in the image forming device.

5. An image forming device comprising:

receiving means for receiving data for cloning an application and associated with a preset private box number, the received data being (i) received from an external image forming device that stores the application in the preset private box number and (ii) including a registration setting for registering the application;

loading means for loading the received data for cloning;

selecting means for selecting, based on the registration setting of the received data for cloning, between first and second register modes after the application to be executed by using the received data for cloning is cloned into the image forming device, the first register mode being a mode for manual private box number association with the application in the image forming device, the second register mode being a mode for automatic private box number association with the application in the image forming device; and registering means for registering the cloned application based on the selected one of the first register mode and the second register mode, wherein the application is configured to store scanned data in the preset private box number, the scanned data is different from the received data for cloning, and the registering of the cloned application results in association of the cloned application in the image forming device with the preset private box number or another private box number in the image forming device.

* * * * *